United States Patent
Cohen-Scali et al.

(10) Patent No.: US 9,584,872 B2
(45) Date of Patent: Feb. 28, 2017

(54) METHOD TO BIND THE USE OF A TELEVISION RECEIVER TO A PARTICULAR NETWORK

(71) Applicant: NAGRAVISION S.A., Cheseaux-sur-Lausanne (CH)

(72) Inventors: Remi Cohen-Scali, Lausanne (CH); Ivan Baroffio, Renens (CH); Jean-Bernard Fischer, Rochejean (FR); David Farcy, Pully (CH)

(73) Assignee: NAGRAVISION S.A., Cheseaux-sur-Lausanne (CH)

( * ) Notice: Subject to any disclaimer, the term of this patent is extended or adjusted under 35 U.S.C. 154(b) by 0 days.

(21) Appl. No.: 14/388,691

(22) PCT Filed: Mar. 26, 2013

(86) PCT No.: PCT/EP2013/056334
§ 371 (c)(1),
(2) Date: Sep. 26, 2014

(87) PCT Pub. No.: WO2013/144109
PCT Pub. Date: Oct. 3, 2013

(65) Prior Publication Data
US 2015/0052545 A1    Feb. 19, 2015

Related U.S. Application Data

(60) Provisional application No. 61/616,458, filed on Mar. 28, 2012.

(30) Foreign Application Priority Data

Sep. 7, 2012  (EP) ................................. 12183430

(51) Int. Cl.
*H04N 21/6334* (2011.01)
*H04N 21/254* (2011.01)
*H04N 21/236* (2011.01)
*H04N 21/2347* (2011.01)
*H04N 21/258* (2011.01)
*H04N 21/266* (2011.01)
*H04N 21/61* (2011.01)
*H04N 21/643* (2011.01)
(Continued)

(52) U.S. Cl.
CPC ..... *H04N 21/6334* (2013.01); *H04N 21/2347* (2013.01); *H04N 21/23611* (2013.01);
(Continued)

(58) Field of Classification Search
CPC ................................................. H04N 21/26613
See application file for complete search history.

(56) References Cited

U.S. PATENT DOCUMENTS

2002/0002706 A1 * 1/2002 Sprunk ............... H04N 7/1675
725/29
2002/0083438 A1    6/2002 So et al.
(Continued)

OTHER PUBLICATIONS

International Search Report issued in International Application No. PCT/EP2013/056334 dated May 7, 2013.
(Continued)

*Primary Examiner* — Justin Shepard
(74) *Attorney, Agent, or Firm* — DLA Piper LLP (US)

(57) ABSTRACT

A method to bind the use of a digital audio/video service data receiver to a network on which at least one services provider broadcasts access controlled and free digital audio/video services streams, the method having the steps: receiving by the receiver a periodic signal transmitted by a conditional access system server via the network, said periodic signal being processed by a run time software embedded in the receiver to check legitimacy of the network; displaying services available on the network only if said run time software recognizes the periodic signal as indicating network legitimacy; and checking operability of the run time software and if necessary taking actions to enforce limitation of using the receiver on the network checked as legitimate. The invention further discloses a receiver bound to a specific network configured to perform the method.

9 Claims, 1 Drawing Sheet

(51) Int. Cl.
    *H04N 21/435*      (2011.01)
    *H04N 21/4623*     (2011.01)
    *H04N 21/4627*     (2011.01)

(52) U.S. Cl.
    CPC ... *H04N 21/23617* (2013.01); *H04N 21/2541* (2013.01); *H04N 21/25816* (2013.01); *H04N 21/26606* (2013.01); *H04N 21/26613* (2013.01); *H04N 21/4353* (2013.01); *H04N 21/4623* (2013.01); *H04N 21/4627* (2013.01); *H04N 21/6125* (2013.01); *H04N 21/64322* (2013.01)

(56) References Cited

U.S. PATENT DOCUMENTS

| | | | |
|---|---|---|---|
| 2004/0198389 A1* | 10/2004 | Alcock | H04M 3/42229 455/456.1 |
| 2008/0022299 A1* | 1/2008 | Le Buhan | H04N 7/163 725/25 |
| 2008/0037656 A1* | 2/2008 | Hannuksela | H04N 21/23614 375/240.26 |
| 2008/0075285 A1 | 3/2008 | Poli et al. | |
| 2009/0080648 A1 | 3/2009 | Pinder | |
| 2011/0064219 A1 | 3/2011 | Edlund et al. | |
| 2011/0261254 A1* | 10/2011 | Choo | H04N 5/913 348/441 |
| 2011/0276993 A1* | 11/2011 | Ferguson | H04N 7/173 725/30 |

OTHER PUBLICATIONS

Written Opinion issued in International Application No. PCT/EP2013/056334 dated May 7, 2013.

\* cited by examiner

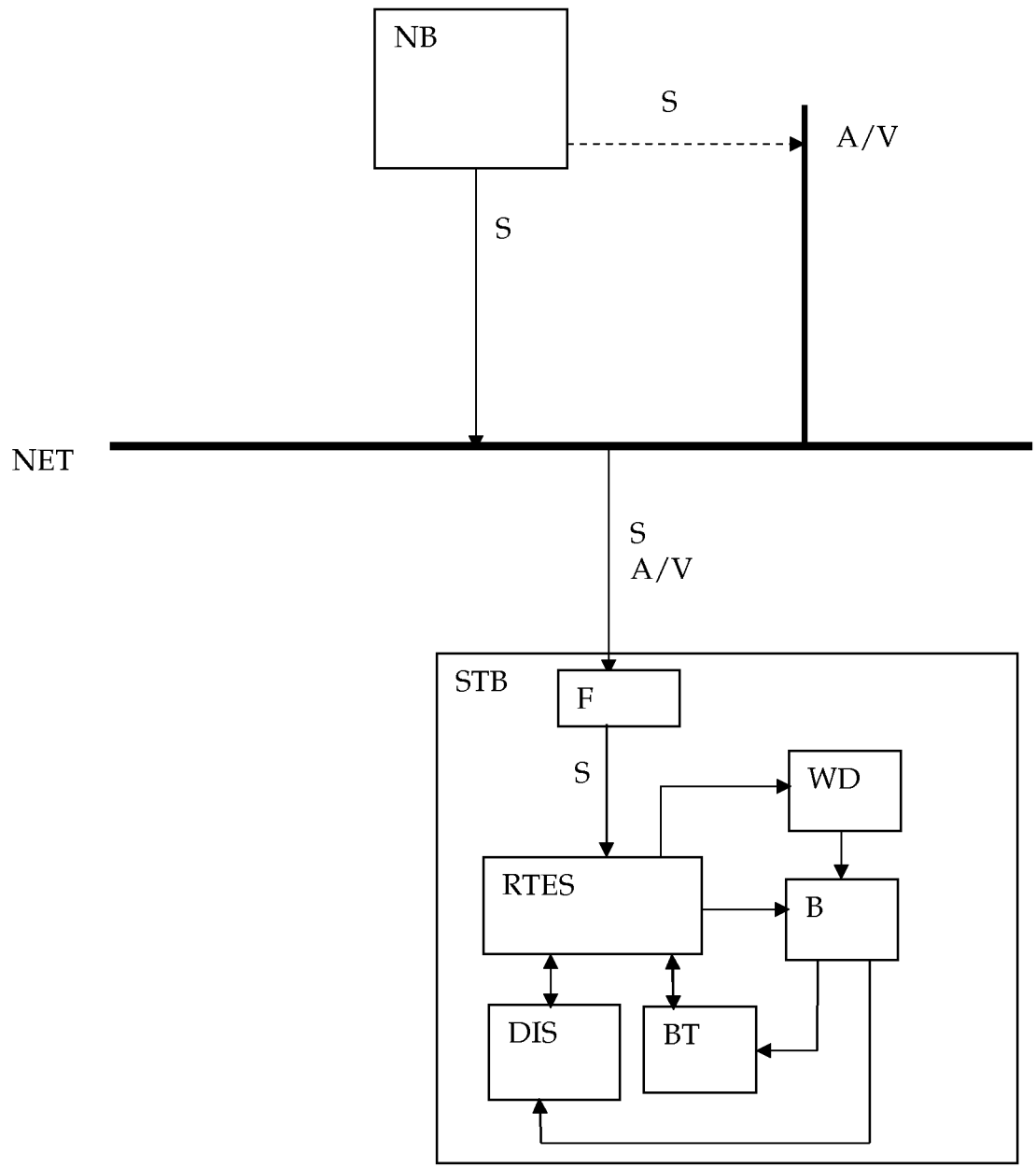

METHOD TO BIND THE USE OF A TELEVISION RECEIVER TO A PARTICULAR NETWORK

CROSS REFERENCE TO RELATED APPLICATIONS

This application is a U.S. National Stage Application of International Application No. PCT/EP2013/056334, filed Mar. 26, 2013, which claims priority from European Patent Application No. 12183430.3, filed Sep. 7, 2013 and U.S. Provisional Patent Application No. 61/616,458, filed Mar. 28, 2012.

INTRODUCTION

The present invention relates to the field of the transmission of audio/video content by means of digital networks, in particular the control of the use of a television receiver on a particular network

TECHNICAL BACKGROUND

When a country decides to convert its analogue television network to a digital television, the use of digital receiver is necessary to convert the digital signal to an analogue signal suitable for the television not having the capability to decode the digital signal. A digital receiver can also be used with a digital television, the digital receiver or STB can provide additional services such as EPG or storage not proposed by the digital television.

In order to ease this transition, the cost of the digital converter is in full or part taken by the television provider. This is why this television provider should ensure that the digital converter is only use in connection with the reception of signals broadcasted by this provider.

DVB compliant digital converter (STB) may be used on any DVB network for displaying Free-To-Air services (no dependency on the Conditional Access System, DVB was designed for this). For some reasons, the provider (for example, he subsidized STB and it has a value for him), may want to restrict the usage of these STBs to its network only including also Free-To-Air services.

Since Free-To-Air services are (by definition) not scrambled (no need to use the Conditional Access system to access audio/video services), the Conditional Access systems cannot enforce this usage restriction.

SUMMARY OF THE INVENTION

A goal of the present invention is to avoid that some DVB set-top boxes, built and financed by an operator, are used on another network (e.g. in another country).

The goal is reached by a method to bind the use of a digital audio/video service data receiver to a network on which at least one service provider broadcasts access controlled and free digital audio/video services streams, the method is characterized by the steps of:
  receiving by the receiver a periodic signal transmitted by a network beacon via the network, said periodic signal being processed by a run time software embedded in the receiver to check legitimacy of the network,
  displaying services available on the network only if said run time software recognizes the periodic signal indicates a legitimate network,
  checking operability of the run time software and if necessary taking actions to enforce limitation of using the receiver on the network.

The present invention further relates to a receiver configured to receive digital audio/video services data streams via a network comprising:
  a filter configured to extract one service among services broadcast in the audio/video data streams on a network,
  a receiver, connected to the same network to receive a security message,
  a run time software to control the functionalities of the receiver and to receive the security message,
  a blocking means activated by the run time software applied on services decoding and display functions of the receiver or on the receiver booting function, and
  a watchdog mechanism acting on the blocking means and triggered by the run time software upon reception of the security message, said security message being processed by said run time software to check legitimacy of the network.

BRIEF DESCRIPTION OF THE FIGURE

The invention will be better understood with the following detailed description, which refers to the attached FIGURE given as a non-limitative example.

FIG. 1 shows a block schematic representing a receiver configured according to the invention connected to a conditional access server via a network

DETAILED DESCRIPTION OF THE INVENTION

Basically the present invention is based on the use of a network beacon (NB) for restricting Set-top-box STB usage to a specific network. The STB comprises at least a tuner to receive the digital television signal, a filter to extract the streams forming a service and an output to source the video/audio signal to the television. In case of IP-TV, the STB is connected to a remote DSLAM and the tuner is replaced by an IP packets receiver.

The security message is sent also to network having only free-to-air channels, i.e. the channels are not encrypted and not subject to access control. In this case, the usual security means, present in the STB, are not solicited (no EMM or ECM are sent with the audio/video stream) and cannot take the necessary action against the misuse of the STB.

The system implies a receiver STB or set-top box, an embedded operating system comprising a Run Time Embedded Software (RTES), a network NET (transport) and a periodic signal S (or security message) emitted from a network beacon. The RTES is implemented into the STB and is in charge of receiving the periodic signal S which is in the form of a security message transmitted by the network beacon, decrypting the security messages and interpreting a command included in the same as well as to take the necessary actions to enforce the limitation of the use of the STB to a specific network NET.

The basic use case is that an operator provides a set-top box STB to a subscriber. The subscriber sets up the box STB on the original operator network NET and the box displays services. Then the subscriber takes the box out of the network NET. The box stops to run smoothly (for example by rebooting frequently with increased boot time).

The embedded software holds a function for allowing the STB to display service or not (including Free-To-Air services), at will.

The periodic signal S is emitted by the network beacon NB on the legitimate network NET and consists in a security or cryptographic message that only the RTES is able to recognize. Thus it knows it is on the legitimate network NET. The network beacon NB can embed the periodic signal S in a service channel of the network NET (first embodiment illustrated in the FIG. 1) or can embed the periodic signal S into the transport stream f the audio/video (dotted arrow in FIG. 1). The RTES lets then the STB display services. If the signal S becomes unavailable, the RTES prevents services to be displayed. The security message is preferably encrypted with a key known by the RTES. The message can be in clear with an authentication signature. This signature is cryptographically generated by the network beacon NB and verified by a corresponding key in the RTES (asymmetric keys). This key can be loaded into the STB at the manufacture or during an initialization of same. In order to increase the level of security, a set of keys are loaded into the STB. The security message can contain a header and an encrypted payload, the header indicating which key from the set should be used to decrypt the payload. The header may include a time stamp used entirely or partially to select the current key, for example: key 1 used for the month 01 (January), key 2 used for the month 02 (February) and so on.

In the below description, when we consider the case of receiving a periodic signal, we also mean that this signal is tested and recognized as valid, in the contrary, it is considered as not received.

In order to guaranty the RTES is up and running or operating, a further mechanism is needed.

There are two possibilities to check operability of the RTES depending on the availability of mechanisms on the STB.

A first preferred mechanism is to have a secure lock mechanism that locks the display and requires some secure method for unlocking. The second method is a mechanism based on a secure watchdog WD that will reset the STB unless it is regularly patted or launched at regular intervals by the embedded software RTES.

Eventually both may be combined.

Three Cases:
1) STB has no service display until the feature is unlocked by the RTES
2) STB has service display from the start, but is reset every given period (e.g. 5 minutes) unless the RTES decides otherwise
3) STB receives the services and allows the display of the selected service (or services), a timer is initiated at the boot by the RTES. In case that a periodic signal is received within a predefined period T, the RTES allows the STB to display the service. In the contrary, the RTES blocks the display of the service.

Workflow of STB Initialization in Case 1)
boot of STB blocks the service display
RTES boots up
RTES unlocks the service display when it decides it is on the legitimate network (reception of the signal during a given period)
Workflow of STB Initialization in Case 2)
boot of STB sets the watchdog with initial period and the WD starts decrementing
RTES boots up
RTES pats the WD at regular intervals
RTES stops patting the WD when it decides it is not on the legitimate network NET anymore (no more reception of the signal S for a given period).
Workflow of STB Initialization in Case 3)
boot of STB sets the watchdog with a timer loaded with a predefined period T and the WD starts decrementing the timer
wait for the reception of periodic signal S
WD continue to decrement the timer
RTES pats the WD at regular intervals
RTES detect that the WD has reached the end of the predefined period T and active blocking means to stop the display of the service if no periodic signal has been received within the predefined period.

Description of the Secure Watchdog WD Mechanism:

The receiver or set top box STB is equipped with a secured count down timer (watchdog or WD). This watchdog is secured in that only the boot process and the RTES can pat it. Once the watchdog is programmed, the RTES will service securely the watchdog. Each time the watchdog needs to be serviced, the RTES decides if the conditions are fulfilled. If true, WD is serviced and set-top box STB continues running normally. If false, the watchdog is not serviced and set-top box STB reboots.

Solution: Combined Operation

As what it is needed is a reset if the RTES is not running for a given time, it is enough to combine the two methods to obtain a full coverage of all risks.

It is worth noting that the secure messages contain optionally a unique tag that is stored by the RTES. This tag is used to avoid that the same security message is reused. The tag (that could be a time stamp) should change in order that the RTES accepts a new message. This avoids replaying the security message to circumvent the security feature. The RTES can store the last tag or the last tags, e.g. the last 20 tags in a circular buffer. The tag of a new message, when successfully processed, is stored in the memory and the older tag is removed.

The messages can be included into one of the sub-stream of the service such as Entitlement Control Messages ECM or can be common to all services such as Entitlement Management Message EMM. In case that the broadcast signal comprises a plurality of transport streams, the security messages are duplicated and integrated in a sub-stream of each transport stream.

The present invention cover also a receiver STB as illustrated by FIG. 1 configured to receive audio/video services A/V streams broadcast via a network NET comprising a filter F configured to extract one service among the services included in the audio/video A/V streams and a particular sub-stream transporting messages controlling the receiver STB and access to the extracted service. The filter F is further configured to forward the sub-stream to the RTES. The receiver STB further comprises a blocking means B applied on the decoding and displaying functions DIS or the boot function BT of the receiver STB, this blocking means B being activated by the RTES. A watchdog mechanism WD to act on the blocking means B is also implemented in the receiver STB. The watchdog WD is triggered by the RTES upon reception of a periodic signal S such as a security message transmitted via the network NET in the sub-stream by a network beacon NB. The periodic signal S is processed by the RTES to check legitimacy of the network NET.

The invention claimed is:

1. A method to bind the use of a digital audio/video receiver to a network, the method comprising the steps of:
   receiving by the digital audio/video receiver a periodic signal transmitted by a network beacon via a network on which at least one service provider broadcasts access-controlled or free-to-air digital audio/video services streams, said periodic signal being processed by a run time software embedded in the receiver to check legitimacy of the network;
   displaying services available on the network only if said run time software recognizes that the periodic signal indicates a legitimate network; and
   checking operability of the run time software and if necessary enforcing a limitation on using the receiver on the network;
   wherein the periodic signal transmitted by a network beacon comprises security messages encrypted with a key known by the run time software; and
   wherein each of the security messages contains a unique tag stored by the run time software, said tag changing regularly to prevent replaying a same security message.

2. The method according to claim 1, wherein the periodic signal transmitted by a network beacon comprises unencrypted security messages accompanied by an authentication signature cryptographically generated by the network beacon, said signature being verified by the run time software using a corresponding key previously stored in a memory of the receiver.

3. The method according to claim 1, wherein the periodic signal transmitted by a network beacon comprises at least one security message containing a header and a payload, the header indicating which key to use for decrypting the security message payload in a set of keys previously stored in a memory of the receiver.

4. The method according to claim 3, wherein the header includes a time stamp used entirely or partially to determine the key to be used to decrypt the payload of the security message.

5. The method according to claim 1, wherein enforcing a limitation on using the receiver on the network comprises:
   at initialization of the receiver, booting the receiver and blocking the display of the services available on the network; and
   booting the run time software and unlocking the services upon reception of a valid periodic signal.

6. The method according to claim 1, wherein enforcing a limitation on using the receiver on the network comprises:
   at initialization of the receiver, booting the receiver and enabling the display of the services on the network; and
   resetting the receiver periodically until the run time software receives and recognizes a valid periodic signal as indicating network legitimacy.

7. The method according to claim 1, wherein enforcing a limitation on using the receiver on the network comprises:
   at initialization of the receiver, booting the receiver and enabling the display of the services available on the network for a predetermined period, and if a valid periodic signal is not received within the predefined period, blocking the display of the service.

8. The method according to claim 1, in which the services are broadcasted to the network as a plurality of transport streams, wherein the periodic signal is duplicated and inserted in a sub-stream of each transport stream of the network.

9. The method according to claim 1, in which the services are broadcasted to the network in at least one transport stream, wherein the periodic signal is inserted in a service channel of the network independent of the transport stream.

* * * * *